Nov. 18, 1941.  J. E. HALL  2,263,086
FLUID MOTOR
Filed May 15, 1940  5 Sheets-Sheet 2

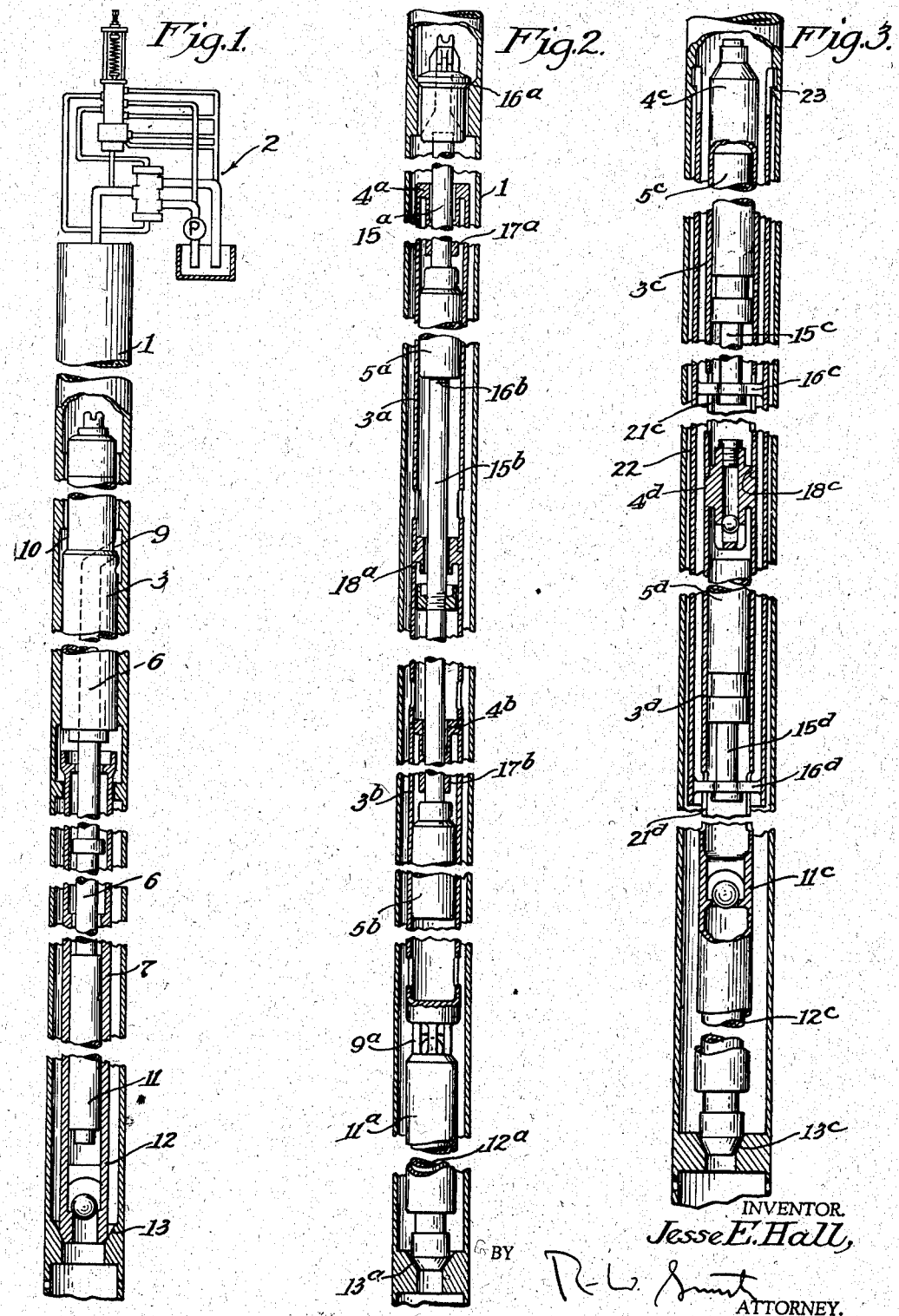

INVENTOR.
Jesse E. Hall,
By R. W. Smith
ATTORNEY.

Nov. 18, 1941.    J. E. HALL    2,263,086
FLUID MOTOR
Filed May 15, 1940    5 Sheets-Sheet 3
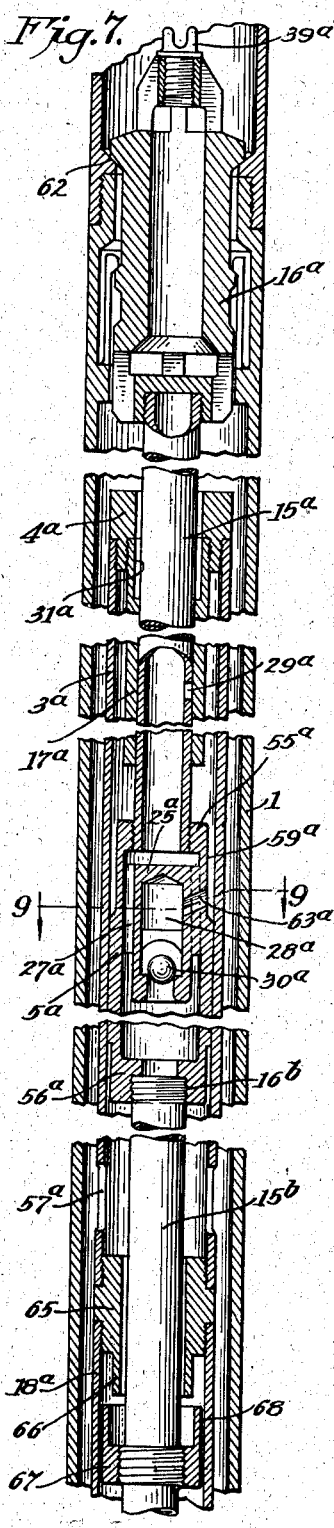
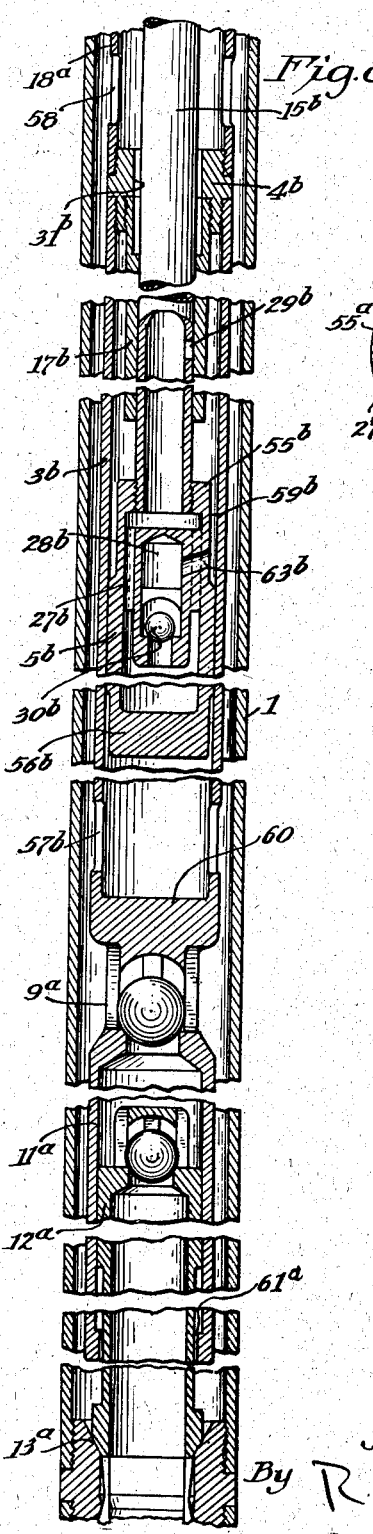
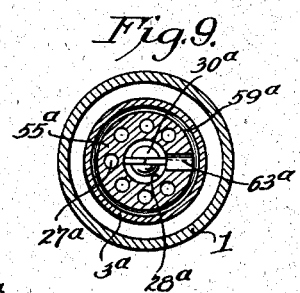
INVENTOR.
Jesse E. Hall,
By R. W. _____
ATTORNEY.

Nov. 18, 1941.  J. E. HALL  2,263,086
FLUID MOTOR
Filed May 15, 1940  5 Sheets-Sheet 4
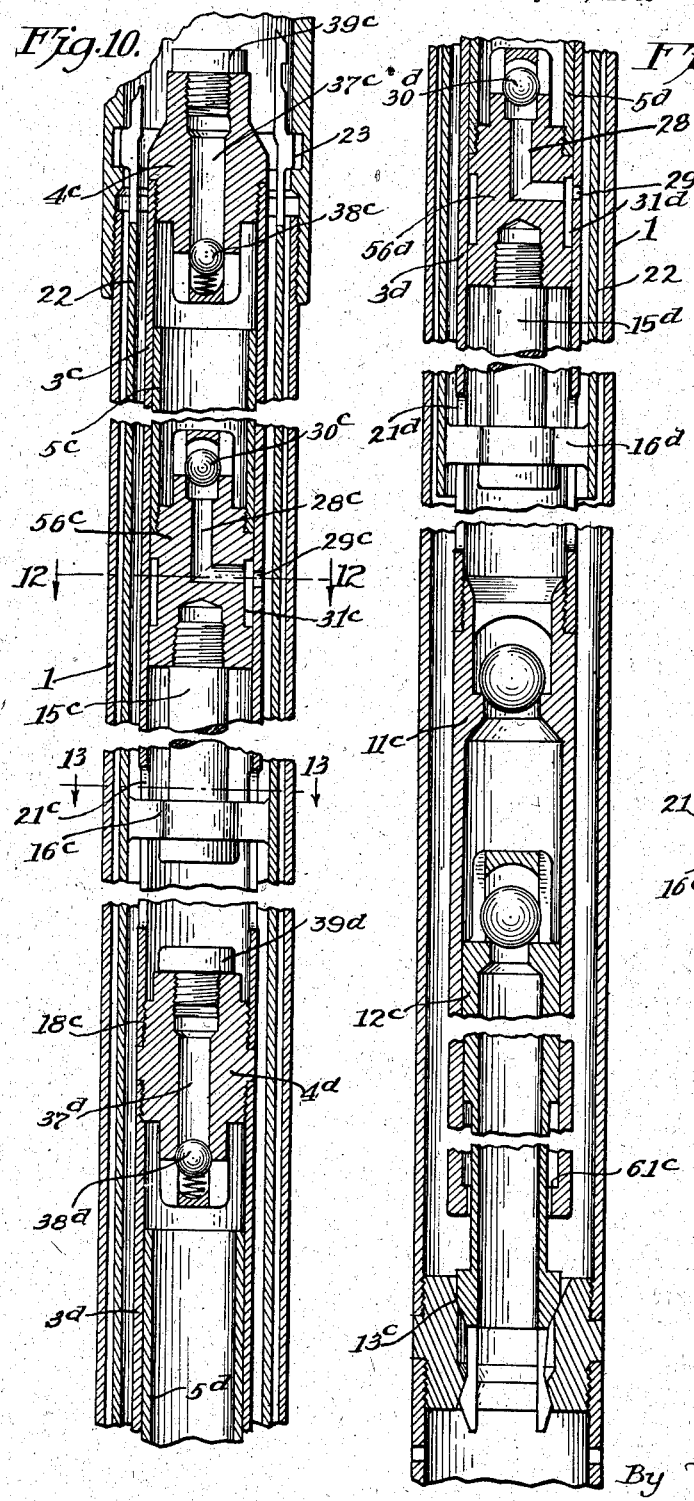
INVENTOR.
Jesse E. Hall,
By R. W. Smith

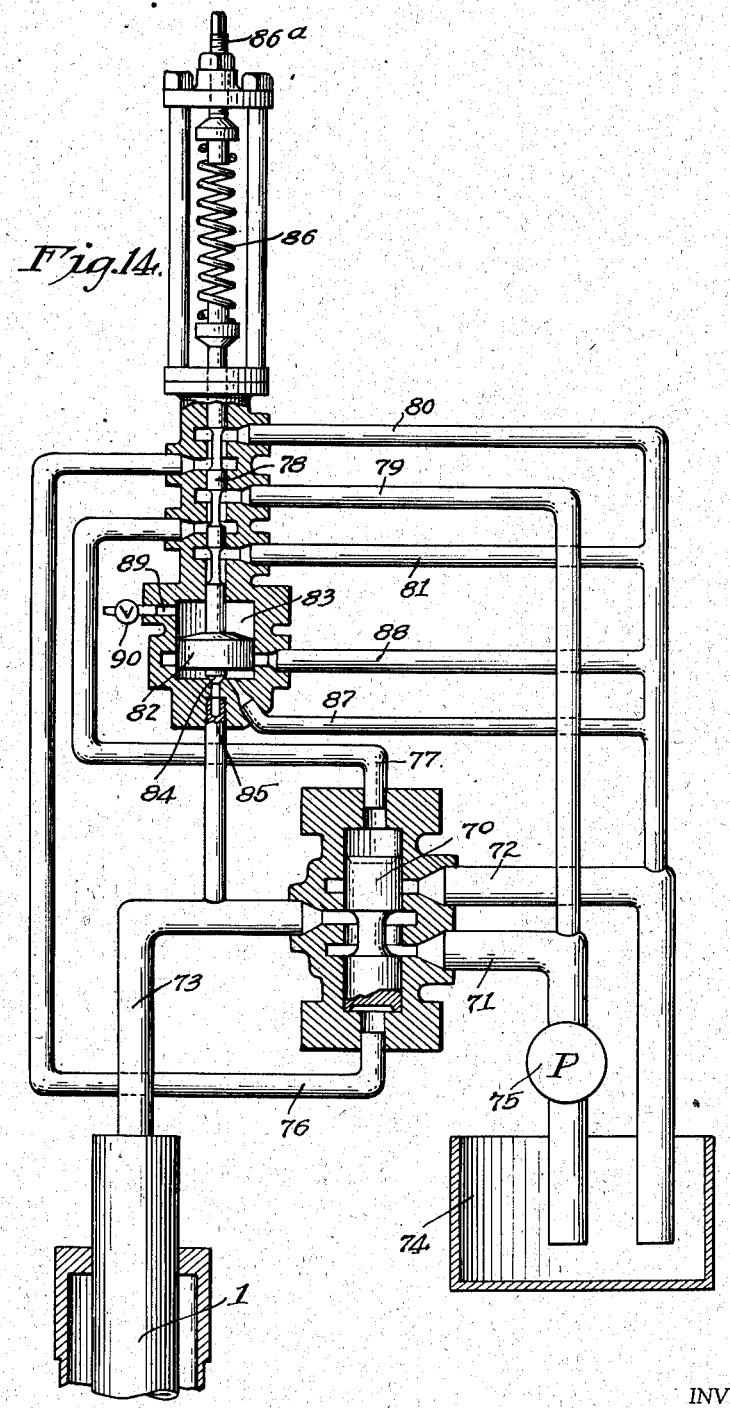

Patented Nov. 18, 1941

2,263,086

UNITED STATES PATENT OFFICE 2,263,086

FLUID MOTOR

Jesse E. Hall, Los Angeles, Calif., assignor to Pacific Pump Works, Huntington Park, Calif., a corporation of California Application May 15, 1940, Serial No. 335,291

8 Claims. (Cl. 121—150)

This invention is a fluid motor, the present invention being a continuation in part of my copending applications Ser. No. 242,750, filed November 28, 1938, and Ser. No. 288,629, filed August 5, 1939.

It is an object of the invention to reciprocate a motor by alternately exerting and relieving fluid pressure in a conduit in which the motor is mounted, with the pressure alternately supplied and relieved at a point in the conduit remote from the motor, and with the pressure-driven stroke of the reciprocating motor in the direction of pressure supply and its reverse stroke in the direction of pressure relief.

It is a further object of the invention to adapt the fluid, pressure of which is alternately exerted and relieved in the conduit, for passage via said conduit to or from apparatus which is mounted therein for reciprocation by the reciprocating motor.

It is a still further object of the invention to connect the reciprocating motor and the reciprocatory driven apparatus so that their strokes in the same direction are at the same time.

More particularly it is an object of the invention to contract a compression chamber and thereby compress an elastic fluid on the pressure-driven stroke of the reciprocating motor, for storing energy which upon relief of the pressure fluid expands the compression chamber for producing the reverse stroke of the motor.

It is a still further object of the invention to seal the compression chamber to the pressure fluid throughout the major portion of contraction and expansion of the compression chamber; but at terminal contraction to preferably open the compression chamber to the pressure fluid in the event the pressure in the compression chamber is less than that of the pressure fluid, and if desired and at terminal expansion of the compression chamber to discharge therefrom into the pressure fluid in the event the pressure in the compression chamber exceeds that of the relieved pressure fluid.

The fluid motor is particularly adapted for installation at any desired level in a well, e. g. an oil well, for reciprocating a pump, jar or other well apparatus which is suspended from the motor, with the motor actuated by alternately exerting and relieving fluid pressure in a tubing string in the well, and with this fluid adapted for passage to or from the suspended well apparatus via this same tubing string.

Further objects of the invention will be readily understood from the following description of the accompanying drawings which illustrate various forms which the invention may assume in practice, it being understood that the forms which are shown and described are for purpose of illustration, and that the invention may be modified and is entitled to various forms without departing from the scope of the appended claims.

In the drawings:

Fig. 1 is a diagram of one embodiment of the invention.

Fig. 2 is a similar view showing a modification.

Fig. 3 is a similar view showing a further modification.

Fig. 7 is an axial section through the upper portion of that form of the invention which is diagrammed at Fig. 2.

Fig. 8 is an axial section through the lower portion of this form of the invention.

Fig. 9 is a transverse section on the line 9—9 of Fig. 7.

Fig. 10 is an axial section through the upper portion of that form of the invention which is diagrammed at Fig. 3.

Fig. 11 is an axial section through the lower portion of this form of the invention.

Fig. 12 is a transverse section on the line 12—12 of Fig. 10.

Fig. 13 is a transverse section on the line 13—13 of Fig. 10.

Fig. 14 is an axial section through the control means for the fluid motor.

Figure 4:
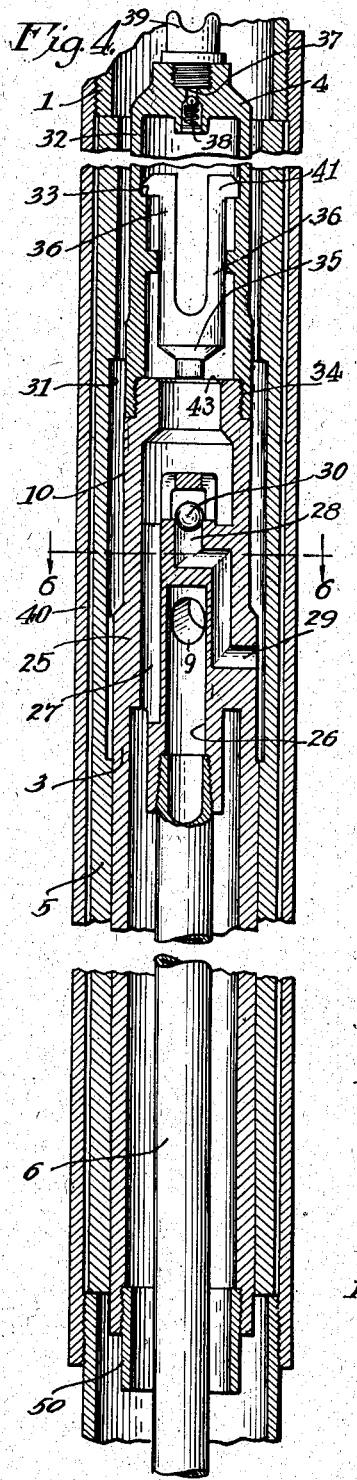
Fig. 4 is an axial section through the upper portion of that form of the invention which is diagrammed at Fig. 1.

The invention is applicable to any structure wherein a fluid motor is adapted for reciprocation in a conduit by alternately exerting and relieving fluid pressure in the conduit from a point remote from the fluid motor, with the pressure-driven stroke of the motor in the direction in which pressure fluid is supplied to the fluid motor from the remote point and with the reverse stroke of the motor in the direction in which pressure in the conduit is relieved at said remote point. The reciprocating motor and the driven apparatus which is adapted for reciprocation in the conduit, are connected so that their strokes in the same direction are preferably at the same time; and the conduit is preferably adapted for passage of fluid (the pressure of which is alternately exerted and relieved) to or from the driven apparatus.

The invention is particularly applicable and is therefore described in connection with an oil well. The motor is mounted at any desired level in a well string for reciprocating a pump, jar or other apparatus which is suspended in the well string from the motor, with a control at the earth's surface supplying or relieving fluid pressure via the well string for reciprocating the pump, and with this fluid preferably adapted for passage via the well string to or from the driven apparatus.

At Figs. 1 to 3, a usual well string 1 extends from the earth's surface into a well bore; and a reciprocating fluid motor is installed in the well string at any desired level, preferably immediately above the apparatus which is to be driven by the motor. The driven apparatus is shown as a usual lift pump comprising a valved pump plunger adapted for reciprocation relative to a valved pump barrel which is mounted in the well string. The reciprocating pump plunger and the reciprocating fluid motor are connected so that their strokes in the same direction are at the same time.

The well string contains a column of fluid, and a control 2 at the earth's surface (shown at Fig. 1 but also employed with the modifications shown at Figs. 2 and 3) provides for alternately exerting and relieving pressure on this column of fluid, for reciprocating the fluid motor and its suspended driven apparatus. The column of fluid is preferably adapted for passage via the well string to or from the driven apparatus, thereby providing circulation fluid when the driven apparatus is a jar, and constituting the pumped fluid when the driven apparatus is a pump.

By exerting pressure on the column of fluid via the control 2, the fluid motor and its suspended driven apparatus are driven downwardly in the well string, thereby contracting a compression chamber for compressing an elastic fluid. In the illustrated embodiments of the invention wherein the driven apparatus is a lift pump, this pressure-driven stroke of the fluid motor is the filling stroke of the pump.

By then relieving pressure in the well string via the control 2, the compressed elastic fluid drives the fluid motor and its suspended driven apparatus upwardly in the well string. In the illustrated embodiments of the invention wherein the driven apparatus is a lift pump, this pressure-relief stroke of the fluid motor is the discharge stroke of the pump, thereby elevating fluid from the well via the column of fluid in the well string and thence via the control 2.

Referring to Fig. 1, the fluid motor is a sleeve 3, closed at its upper end as shown at 4 and adapted for sealed sliding fit in a liner 5 which is fixed in the well string, with a tube 6 of smaller diameter than the sleeve depending from the open lower end of the sleeve and adapted for sealed sliding fit in a liner 7 which is fixed in the well string in spaced relation below the liner 5. The lower end of the tube 6 is connected to the apparatus which is adapted for reciprocation by the fluid motor; and the upper end of the tube 6 opens through the wall of the sleeve 3 via a port 9 in the upper portion of the sleeve which is of reduced diameter as shown at 10.

Fluid is thus adapted for flow via the bore of the tube 6, to or from the driven apparatus which is suspended from the tube. In the illustrated embodiment, wherein the driven apparatus is a lift pump, valved pump plunger 11 is suspended from and communicates with the tube 6, and is adapted for reciprocation in valved pump barrel 12 which is suspended from the liner 7 and which is releasably anchored in the well string as shown at 13. The pump 11—12 is thus adapted for reciprocation by the fluid motor, for pumping fluid from the well via the bore of the tube 6 and the port 9 and thence via the well string to the earth's surface.

A compression chamber (for an elastic fluid) is formed in the sleeve 5 and in the annular space surrounding the tube 6, with this compression chamber sealed by sliding fit of the sleeve 3 and the tube 6 in the liners 5—7 respectively.

In the modification of the invention shown at Fig. 2, the fluid motor assembly comprises a sleeve 3a adapted for sealed sliding fit on a liner 5a which is suspended in the well string from a supporting tube 15a. The tube 15a extends through a closure 4a at the upper end of the sleeve 3a, and is releasably anchored in the well string as shown at 16a. A liner 17a depends from the closure 4a and is adapted for sealed sliding fit on the tube 15a.

Additional motor assemblies, similar to 3a—4a—15a—17a, may be suspended in tandem relation one below the other, the illustrated embodiment showing two motor assemblies designated by the same reference numerals with the exponents a and b respectively. The sleeve 3b is suspended from the sleeve 3a by a coupling 18a, and the supporting tube 15b is suspended from the liner 5a as shown as 16b.

The apparatus which is to be reciprocated by the fluid motor is suspended from the sleeve of the lowermost motor assembly, i. e. from the sleeve 3b in the illustrated embodiment, with the bore of this driven apparatus communicating via port 9a with an annular space between the wall of the well string 1 and the sleeves 3a—3b. Fluid is thus adapted for flow via the port 9a, to or from the driven apparatus. In the illustrated embodiment, wherein the driven apparatus is a lift pump, valved pump plunger 11a is suspended from the sleeve 3b and is adapted for reciprocation on valved pump barrel 12a which is releasably anchored in the well string as shown at 13a. The pump is thus adapted for reciprocation by the fluid motor, for pumping fluid from the well via port 9a and thence via the well string to the earth's surface.

A compression chamber (for an elastic fluid) is formed in each of the annular spaces between the sleeves 3a—3b and their respective tubes 15a—15b. These compression chambers are sealed at their upper ends by the closures 4a—4b and by sliding fit of the liners 17a—17b on the tubes 15a—15b, and are sealed at their lower ends by sliding fit of the sleeves 3a—3b on the liners 5a—5b.

In the modification of the invention shown at Fig. 3, the fluid motor assembly comprises a sleeve 3c, closed at its upper end as shown at 4c, and adapted for sealed sliding fit on a liner 5c which is closed at its lower end and which is mounted in the well string on a supporting rod 15c so that the liner projects upwardly into the sleeve through the open lower end of the sleeve. The supporting rod 15c projects upwardly from a transverse spider 16c which extends through longitudinal slots 21c in the sleeve 3c. The spider 16c is fixed to a tube 22 which is releasably anchored in the well string as shown at 23.

Additional motor assemblies, similar to 3c—4c—15c—16c—21c, may be mounted in tandem relation one below the other, the illustrated embodiment showing two motor assemblies designated by the same reference numerals with the exponents c and d respectively. The sleeve 3d is suspended from the sleeve 3c by a coupling 18c.

The apparatus which is to be reciprocated by the fluid motor is suspended from the sleeve of the lowermost motor assembly, i. e. from the sleeve 3d in the illustrated embodiment, with the bore of this driven apparatus communicating via the ports 21d of the sleeve 3d, with an annular space between the tube 22 and the sleeves 3c—3d. Fluid is thus adapted for flow via the ports 21d, to or from the driven apparatus. In the illustrated embodiment, wherein the driven apparatus is a lift pump, valved pump plunger 11c is suspended from the sleeve 3d and is adapted for reciprocation on valved pump plunger 12c which is releasably anchored in the well string as shown at 13c. The pump is thus adapted for reciprocation by the fluid motor, for pumping fluid from the well via ports 21d and thence via the bore of the tube 22 and the well string to the earth's surface.

A compression chamber (for elastic fluid) is formed in each of the sleeves 3c—3d, between the closed upper ends of the respective sleeves and the closed lower ends of their cooperating liners 5c—5d, with these compression chambers sealed by sliding fit of the sleeves on the liners.

In each form of the invention, a compression chamber (or a plurality of compression chambers) is thus longitudinally contracted when the fluid motor is driven downwardly by pressure exerted downwardly via the control 2 upon a column of fluid in the well string, thereby compressing the elastic fluid in the compression chamber and downwardly driving the driven apparatus which is suspended from the fluid motor; and when pressure of the column of fluid is relieved via the control 2 at the earth's surface, this upward relief of pressure permits the compressed elastic fluid in the compression chamber to drive the fluid motor upwardly in the well string, thereby upwardly moving the suspended driven apparatus. Movement of the fluid motor and the driven apparatus is thus in the direction of downward pressure via the well string and then in the direction of upward relief of pressure via the well string. Upward relief of pressure in the well string thus aids in the upward stroke of the fluid motor and the driven apparatus.

This is particularly advantageous when the driven apparatus is a lift pump, in that the direction of flow of the column of well fluid during the discharge stroke of the pump, coincides with the direction in which pressure of the column of fluid is being relieved via the control 2. Furthermore, when pumping well fluid, the column of fluid will have some slight inherent elasticity due to gaseous constituents being present with the oil. Therefore, while the column of fluid will be sufficiently non-compressible to insure downward stroke of the fluid motor and the pump when pressure is exerted via the control 2, the slight inherent compression of the fluid will cause some expansion upon relief of pressure via the control 2, and this expansion will be in the direction of upward stroke of the fluid motor and the pump, i. e. in the direction of discharge of well fluid, thereby aiding in said discharge.

Figure 5:
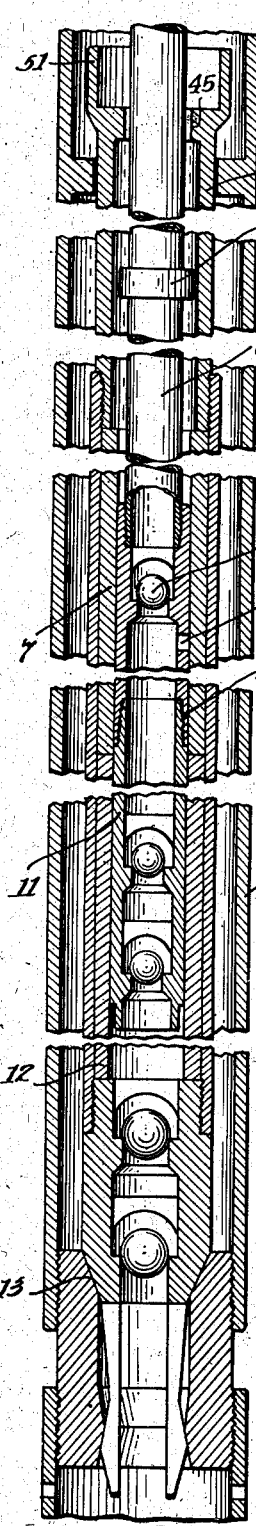
Fig. 5 is an axial section through the lower portion of this form of the invention.
Figure 6:
Fig. 6 is a transverse section on the line 6—6 of Fig. 4.

That form of the invention which is diagrammed at Fig. 1 is shown in detail at Figs. 4 to 6.

The bore of the sleeve 3 is obstructed at the lower end of its diametrically reduced portion 10 and in spaced relation above the open lower end of the sleeve. This obstruction, which is shown at 25 is axially bored at 26, with the tube 6 suspended from and communicating with this axial bore and with the upper end of the axial bore extending laterally through the obstruction 25 and forming the port 9.

The obstruction 25 also has a series of longitudinal bores 27 providing communication between the portions of the compression chamber, i. e. the bore of the sleeve 3, respectively above and below the obstruction.

A bore 28 in the obstruction 25 opens laterally at one end via a port 29 at the outer periphery of the sleeve 3 in spaced relation below its reduced diameter 10, and the other end of the bore 28 communicates with the compression chamber via a check valve 30 which closes against escape of pressure from the compression chamber. The liner 5 has a radially enlarged bore 31 intermediate its ends, so that throughout major portion of reciprocation of the fluid motor the port 29 is closed by the liner 5, but as the fluid motor approaches terminal downward travel the port 29 alines with the enlarged bore 31, thereby opening the port to the well string via the annular space which surrounds the reduced diameter 10 of the sleeve 3.

By this arrangement, at terminal downstroke of the fluid motor, if the elastic fluid in the compression chamber has not been compressed to the pressure exerted via the control 2 on the column of fluid in the well string, fluid from the well string enters the compression chamber via the bore 28 and the check valve 30 until the pressures are equalized; and upon relief of pressure in the well string, for upward stroke of the fluid motor responsive to expansion of the fluid in the compression chamber, the check valve 30 closes against escape of pressure from the compression chamber.

Means are preferably provided whereby prior to lowering the fluid motor into a well, its compression chamber may be precharged. For this purpose, the upper portion of the sleeve 3 forms a precharge chamber 32 below the closure 4 and adapted for detachable mounting on the main portion of the sleeve 3 as shown at 34. A valve 35 is movable in the bore of the precharge chamber for engaging or disengaging a cooperating valve seat 43 in the bore of the sleeve 3, with the valve tending to close responsive to pressure in the precharge chamber but normally releasably locked in open position by spring fingers 36 which project upwardly from the valve and which terminate in heads 41 which normally engage a shoulder 33 in the bore of the chamber 32.

Prior to mounting the precharge chamber on the sleeve 3, the valve 35 and its spring fingers 36 are gripped (being accessible through the open lower end of the detached precharge chamber); the fingers 36 being contracted so as to release the heads 41 from the shoulder 33 and the valve 35 being moved toward the lower end of the precharge chamber, so that when the precharge chamber is then mounted on the sleeve 3 the valve 35 engages its cooperating seat 43 and closes the precharge chamber.

Fluid under pressure is then supplied to the precharge chamber, with the valve 35 maintained in closed position by this pressure. The pressure fluid may be supplied via a nipple 37 in the closure 4, with the nipple provided with a check valve 38 which closes against escape of pressure from the precharge chamber; and the pressure fluid is supplied to the precharge chamber until predetermined pressure has been established therein. The nipple 37 is then preferably closed by an element 39 which provides a readily releasable connection whereby the fluid motor and its suspended driven apparatus may be lowered into or withdrawn from a well.

As the fluid motor is lowered through a column of fluid standing in the well string, the hydrostatic head of the column of fluid compresses the air which is trapped in the compression chamber below its precharge chamber 32; and the precharge pressure in chamber 32 is such that when the fluid motor has been lowered to desired level, ready for operation, the pressure of this compressed air exceeds the pressure in the precharge chamber and thus shifts the valve 35 so as to disengage it from its seat 43. The valve 35 is thus opened, and is releasably locked in open position by the heads 41 of the spring fingers 36 engaging the shoulders 33. Pressures in the chamber 32 and in the main portion of the compression chamber are thus equalized; and the valve 35 then remains locked in open position throughout operation of the fluid motor, so that the precharge chamber forms a part of the compression chamber.

The fluid motor is thus adapted for actuation as previously described, i. e. the pressure of the column of fluid in the well string is increased via control 2 so as to drive the fluid motor 3—6 downwardly through its liners 5—7, thereby further compressing the elastic fluid in the compression chamber; and upon relief of pressure of the column of fluid in the well string, the compressed elastic fluid in the compression chamber expands and thus drives the fluid motor upwardly in the well string.

The liner 5 is preferably fixed in a length 40 of the well string; whereas the liner 7 and the pump barrel 12 are preferably adapted for insertion and withdrawal along with the fluid motor and its suspended pump plunger 11.

As an instance, the liner 7 is fixed in tubing 42 which is mounted in the well string below the liner 5, with the pump barrel 12 suspended from the liner 7 and releasably anchored in the well string at 13; and the tubing 42 and its suspended parts are of a diameter to clear the bore of the liner 5 for insertion or withdrawal through the well string.

A collar 44 is provided on the tube 6, and the bore of the tubing 42 clears the collar 44 except that an annular shoulder 45 in the bore of the tubing 42 at its upper end, is adapted to seat on the collar 44 while the fluid motor is being lowered into and withdrawn from the well, whereby the tubing 42 and its suspended parts are suspended from the fluid motor. After the tubing 42 has been lowered to operative position, the fluid motor is lowered relative thereto so that during reciprocation of the fluid motor the collar 44 is spaced below the shoulder 45.

A check valve 47 which closes against downward pressure is preferably provided in the bore of the tube 6, and a lateral port 48 is provided in the wall of the tube 6 below this check valve, with the pump plunger 11 suspended from the lower end of the tube 6 as shown at 46. The lateral port 48 is so positioned that throughout major portion of reciprocation of the fluid motor the port 48 is closed by the liner 7, but at terminal upstroke of the fluid motor the port is opened to the annular space between the tube 6 and the bore of the tubing 42. This annular space forms a continuation of the compression chamber of the fluid motor, via the bore of the shoulder 45. By this arrangement, at terminal upstroke of the fluid motor, if the pressure of the elastic fluid in the compression chamber has not been reduced to the relieved pressure in the well string, fluid from the compression chamber discharges via the port 48 and the check valve 47 into the upper portion of the tube 6 and thence via port 9 into the well string, until the pressures are equalized; and when pressure is again exerted on the fluid in the well string for downward stroke of the fluid motor, the check valve 47 closes so that elastic fluid is again compressed in the compression chamber.

The ports 29—48 are positioned so as to equalize pressures and thus terminate and cushion reciprocation of the fluid motor short of engagement of the lower end of the sleeve 3 with the upper end of the tubing 42 at terminal downstroke of the motor, and short of engagement of the collar 44 with the shoulder 45 at terminal upstroke of the motor. Additional means are preferably provided for cushioning and terminating abnormal downstroke of the motor.

For this purpose, a collar 50 may depend from the open lower end of the sleeve 3 in radially spaced relation from the tube 6, with the collar of external diameter adapting it for close sliding reception in a bore 51 of the tubing 42, above its shoulder 45. Throughout operation of the fluid motor the elastic fluid in the upper portion of its compression chamber is sealed by the well liquid which during lowering of the fluid motor into the well has been trapped in that portion of the compression chamber which is formed by the bore of the tubing 42 and by the annular space below the sleeve 3 and surrounding the tube 6. This liquid is normally free to enter the sleeve 3 during downstroke of the fluid motor, but in the event of abnormal downstroke such as would telescope the collar 50 in the bore 51, flow of this liquid is restricted, thereby cushioning and terminating abnormal downstroke.

That form of the invention which is diagrammed at Fig. 2 is shown in detail at Figs. 7 to 9; and as above noted corresponding parts of the sleeve and liner assembly 3a—5a and the sleeve and liner assembly 3b—5b are designated by the same reference numerals with the exponents a and b respectively. Except as hereinafter noted, the following description of the sleeve and liner assembly 3a—5a will therefore be understood as applicable when the fluid motor comprises only this one sleeve and liner assembly, or when it comprises a plurality of sleeve and liner assemblies in tandem relation.

The ends of the bore of the liner 5a are closed by caps 55a—56a, and the lower end of the sleeve 3a (below its cooperating liner) communicates via ports 57a with the annular space between the sleeve and the surrounding well string. The supporting tube 15a is connected to and communicates with the bore of the liner 5a via the upper cap 55a.

When the fluid motor comprises only one sleeve and liner assembly, the lower cap of the liner completely closes the lower end of the bore of the liner; but when a plurality of sleeve and liner assemblies are employed in tandem relation (as illustrated), the bore of the liner 5a communicates via its cap 56a with the depending supporting tube 15b for the next lower liner 5b, and only the cap 56b of the lowermost liner completely closes the bore of its liner. The annular space which is above the uppermost sleeve and liner assembly 3a—5a and which surrounds the supporting tube 15a, is a continuation of the annular space between the one or more sleeve and liner assemblies and the surrounding well string; and when a plurality of sleeve and liner assemblies are employed, this annular space between the sleeve and liner assemblies and the surrounding well string communicates via ports 58 in the coupling 18a, with the annular space which is above the sleeve and liner assembly 3b—5b and which surrounds the supporting tube 15b. The annular space between the one or more sleeve and liner assemblies and the surrounding well string, communicates via the bore of the anchoring means 16a with the upper portion of the well string; and when the fluid motor is assembled the anchoring means 16a forms a detachable closure for the upper end of the supporting tube for the liner of the uppermost sleeve and liner assembly, i. e. for the supporting tube 15a.

Returning to detailed description of only one sleeve and liner assembly, i. e. the sleeve and liner assembly 3a—5a, and which description is also applicable to additional sleeve and liner assemblies such as shown at 3b—5b; the bore of the liner 5a is obstructed as shown at 25a, and above this obstruction the outer periphery of the cap 55a has a reduced diameter shown at 59a, so that the annular space between this outer periphery and the surrounding sleeve 3a forms a continuation of the compression chamber (for elastic fluid) which is formed in the bore of the sleeve between its closure 4a and its liner cap 55a. A series of bores 27a open longitudinally through the obstruction 25a, for communication between the lower portion of the bore of the liner 5a and the bore of its supporting tube 15a.

The obstruction 25a is also axially bored as shown at 28a, with the lower end of this axial bore communicating with the lower portion of the bore of the liner 5a, and with the upper end of the axial bore opening laterally through the obstruction 25a at the reduced diameter 59a, as shown at 63a, for communication with the compression chamber of the sleeve 3a. A check valve 30a in the bore 28a, closes against escape of pressure from the compression chamber.

The bore of the closure 4a (through which the supporting tube 15a extends) and the upper end of the bore of the liner 17a are radially enlarged as shown at 31a so as to provide clearance surrounding the tube 15a; and a lateral port 29a is provided in the tube 15a so that throughout major portion of reciprocation of the fluid motor the port 29a is closed by the liner 17a, but as the fluid motor approaches terminal downward travel the enlarged bore 31a alines with the port 29a, thereby opening the port 29a to the bore of the well string.

By this arrangement, at terminal downstroke of the fluid motor, if the elastic fluid in the compression chamber which is formed in the upper portion of the bore of the sleeve 3a, has not been compressed to the pressure exerted via the control 2 on the column of fluid in the well string, fluid from the well string enters the compression chamber via 29a—15a—27a—28a—30a— 63a, until the pressures are equalized; and upon relief of pressure in the well string, for upward stroke of the fluid motor responsive to expansion of the compressed elastic fluid in the compression chamber, the check valve 30a closes against escape of pressure from the compression chamber.

Before lowering the fluid motor into the well, the compression chamber in the sleeve 3a is preferably precharged. For this purpose, with the parts assembled except for suspending the tube 15a from its anchoring means 16a, and with the liner 17a closing the port 29a, fluid under pressure is supplied to the open upper end of the tube 15a and enters the compression chamber in the sleeve 3a, via 15a—27a—28a—30a—63a. Air which is trapped in the compression chamber is thus compressed to any desired precharge pressure, with escape of this precharge pressure prevented by the check valve 30a.

When a plurality of sleeve and liner assemblies are employed in tandem relation, the precharge pressure which is supplied via tube 15a to the compression chamber of the sleeve 3a, is also supplied to the compression chamber of the sleeve 3b, via the tube 15b which communicates with the lower portion of the bore of the liner 5a, and thence via 27b—28b—30b—63b, with the check valve 30b closing against escape of this precharge pressure.

When the fluid motor has been precharged, the tube 15a is suspended from its anchoring means 16a, and by means of an element 39a which is fixed to the anchoring means 16a and which is adapted for releasable engagement by a cable or the like, the entire assembly is lowered through a column of fluid standing in the well string. The entire assembly may be lowered as a unit, since the one or more liners 5a—5b are suspended from the anchoring means 16a, with the one or more sleeves 3a—3b suspended from their liners by the precharged compressed fluid in their compression chambers, and the pump plunger 11a is suspended from a closure 60 at the lower end of the lowermost sleeve, i. e. the sleeve 3b in the illustrated embodiment, with the pump barrel 12a suspended from a shoulder 61a of the pump plunger. After the pump barrel 12a has been releasably anchored in the well string at 13a, continued downward movement of the anchoring means 16a releasably anchors the same in the well string as shown at 62.

The fluid motor is then adapted for actuation as previously described, i. e. the pressure of the column of fluid in the well string is increased via the control 2 to drive the fluid motor 3a (or 3a—3b) downwardly relative to its anchored liner 5a (or 5a—5b), thereby further compressing the elastic fluid in the one or more compression chambers; and upon relief of pressure of the column of fluid in the well string, the compressed elastic fluid in the one or more compression chambers expands and thus drives the fluid motor 3a (or 3a—3b) upwardly in the well string.

The port 29a is positioned so as to equalize pressures and thus terminate and cushion downstroke of the fluid motor short of longitudinal engagement of its reciprocating sleeve structure with its stationary liner structure; and additional means are preferably provided for cushioning and terminating abnormal reciprocation of the motor.

For this purpose, at abnormal reciprocation of the fluid motor, flow of fluid is restricted in the alternately longitudinally contracting and expanding space which when the motor comprises only one sleeve and liner assembly is defined by the bore of the sleeve structure between the closure at its lower end and the lower end of its cooperating liner, and which when the motor comprises a plurality of sleeve and liner assemblies (as illustrated) is defined by the bore of the sleeve structure between its closure 60 and the cap 56b and also between the closure 4b and the cap 56a. This flow of fluid is via ports 57a (and also via ports 57b and 58 when a plurality of sleeve and liner assemblies are employed); and flow of fluid in this alternately contracting and expanding space is unrestricted during normal reciprocation of the fluid motor.

In the event of abnormal downstroke, cooperating collars which are respectively fixed to the reciprocating sleeve structure and to the stationary liner structure are adapted for snug telescopic engagement for restricting this free flow of fluid. As an instance, in the illustrated embodiment which includes the coupling sleeve 18a, an annulus 65 is fixed in the bore of the sleeve structure between the sleeve 3a and the sleeve 18a, and a collar 66 depends from the inner periphery of the annulus 65 and surrounds the tube 15b so as to radially clear the same for free flow of fluid through the bore of the annulus. A second annulus 67 is fixed to the tube 15b, and a collar 68 extends upwardly from the outer periphery of the annulus 67 for relatively snug sliding reception in the bore of the sleeve 18a. The collars 66—68 are longitudinally spaced during normal reciprocation of the fluid motor, but at abnormal downstroke the collar 66 snugly telescopes in the collar 68 which in turn fits relatively snugly in the bore of the sleeve 18a, thereby restricting free flow of fluid in the alternately longitudinally contracting and expanding space which is defined by the bore of the sleeve structure, and thus cushioning and terminating abnormal downstroke of the fluid motor.

In the event of abnormal upstroke of the fluid motor, its sleeve structure is adapted for snug telescopic reception on its cooperating liner structure so as to restrict flow of fluid via the ports 57a (or via the ports 57a and 58 when a plurality of sleeve and liner assemblies are employed).

As an instance, in the illustrated embodiment which includes the coupling sleeve 18a, the ports 57a—57b—58 are unrestricted throughout normal reciprocation of the fluid motor and remain unrestricted in the event of abnormal downstroke; but at abnormal upstroke, the lower end of the sleeve 3a (below its ports 57a) snugly telescopes on the liner cap 56a and the lower end of the coupling sleeve 18a (below its ports 58) snugly telescopes on the annulus 67 and on its collar 68. Flow of fluid via the ports 57a—58 is thus restricted at these snug telescopic engagements, thereby cushioning and terminating abnormal upstroke of the fluid motor.

That form of the invention which is diagrammed at Fig. 3 is shown in detail at Figs. 10 to 13; the detailed construction of the sleeve and liner assembly 3c—5c and of the sleeve and liner assembly 3d—5d being similar, with corresponding parts designated by the same reference numerals with the exponents c and d respectively; and therefore the following detailed description of the sleeve and liner assembly 3c—5c is also applicable to the sleeve and liner assembly 3d—5d.

A cap 56c closes the lower end of the liner 5c, with the supporting rod 15c fixed to this closure cap. The cap 56c has an axial bore 28c, one end of which opens laterally through the cap into an annular groove 31c at the periphery of the cap, and the other end of the bore 28c communicates via a check valve 30c with the compression chamber which is formed in the bore of the sleeve 3c and in the bore of its liner 5c. The check valve 30c closes against escape of pressure from the compression chamber.

The sleeve 3c has a port 29c, so positioned that throughout major portion of reciprocation of the fluid motor the port 29c is closed by the liner 5c, but as the fluid motor approaches terminal downward travel the port 29c alines with the annular groove 31c, thereby opening the bore 28c to the annular space between the sleeve 3c and the surrounding tube 22. This annular space is open at its upper end to that portion of the well string which is above the anchoring means 23.

By this arrangement, at terminal downstroke of the fluid motor, if the elastic fluid in the compression chamber has not been compressed to the pressure exerted via the control 2 on the column of fluid in the well string, fluid from the well string enters the compression chamber via 29c—28c—30c, until the pressures are equalized; and upon relief of pressure in the well string, for upward stroke of the fluid motor responsive to expansion of the fluid in the compression chamber, the check valve 30c closes against escape of pressure from the compression chamber.

The compression chamber is preferably precharged prior to lowering the fluid motor into a well. For this purpose, fluid under pressure is supplied to the compression chamber via a pressure supply nipple 37c which is formed in the closure 4c and which has a check valve 38c for preventing escape of pressure from the compression chamber. Air in the compression chamber may thus be compressed to any desired precharge pressure, and the nipple 37a is then preferably closed as shown at 39c. When the fluid motor comprises more than one sleeve and liner assembly, each lower sleeve and liner assembly 3d—5d is precharged via its nipple 37d, before suspending it by its coupling 18c from the next upper sleeve and liner assembly.

With the parts assembled, the entire structure may be lowered as a unit into a column of fluid standing in the well string, with the liner structure supported by the tube 22 and with the sleeve structure suspended relative to its liner structure by the compressed elastic fluid in the one or more compression chambers, and with the pump plunger 11a suspended from the sleeve structure and in turn suspending the pump barrel 12c from a shoulder 61c of the pump plunger. When the pump barrel 12c has been anchored at 13c, continued downward movement of the assembled structure releasably anchors the tube 22 in the well string at 23.

The fluid motor is then adapted for operation as previously described, i. e. pressure exerted via control 2 on the column of fluid in the well string drives the sleeve structure downwardly relative to the stationary liner structure, thereby further compressing the elastic fluid in the one or more compression chambers; and upon relief of pressure on the column of fluid in the well string, the compressed elastic fluid expands and drives the sleeve structure upwardly in the well string.

In each form of the invention as described, the fluid motor is thus adapted for actuation by alternately exerting and relieving pressure on a column of fluid in the well string; and this column of fluid, in the illustrated embodiments of the invention, is the fluid which is to be pumped from the well by the pump which is operatively suspended from the fluid motor. The control 2 at the earth's surface alternately supplies fluid to the well string (for increasing pressure of the column of fluid) and discharges fluid from the well (for relieving pressure of the column of fluid).

As an instance, and as shown in detail at Fig. 14, a piston valve 70 at the earth's surface is adapted for reciprocation for alternately opening conduits 71—72 to a conduit 73 which communicates with the well string 1; and the conduits 71—72 respectively communicate with a source of fluid under pressure and with storage for said fluid. This fluid preferably has some slight inherent elasticity but is sufficiently non-compressible to insure downstroke of the fluid motor when the fluid is supplied to the well string, e. g. in the illustrated embodiments of the invention the fluid is the production fluid which is pumped from the well. The fluid which is discharged via conduit 72 during pressure relief in the well spring, flows to a storage receptacle 74; and a pump 75 in the conduit 71 then returns a portion of this fluid to the well string under pressure, for the pressure stroke of the fluid motor.

The piston valve 70 may be positively reciprocated by fluid pressure which is alternately exerted and relieved via conduits 76—77 which communicate with the respective ends of the piston valve, and this fluid pressure for reciprocating the piston valve may be pressure of the fluid which is supplied via the conduit 71. As an instance, a pilot valve 78 is adapted for reciprocation so that when at one limit of travel as shown at Fig. 14, a conduit 79 which communicates with the conduit 71 is open to the conduit 77 for shifting the valve 70 to the position shown, with the conduit 76 open to a conduit 80 which communicates with the conduit 72, for relieving pressure at the opposite end of the piston 70. Pressure is thus supplied to conduit 73 from the conduit 71, for building up pressure in the well string.

When predetermined pressure has been attained in the well string (for downstroke of the fluid motor and compression of elastic fluid in its compression chamber) the valve 78 is shifted to its opposite limit of travel, thereby opening the conduit 77 to a conduit 81 which communicates with the conduit 72, and opening the conduit 76 to the conduit 79. Pressure is thus relieved via the conduit 77 and is exerted via the conduit 76, for shifting the valve 70 to its opposite limit of travel. Pressure in the well string is thus relieved via the communicating conduits 73—72 (for driving the fluid motor upwardly by expansion of the compressed elastic fluid in its compression chamber); and in the illustrated embodiments wherein the fluid motor operates a pump, the pumped fluid is discharged via these communicating conduits 73—72. Upon relief of pressure in the well string, the valve 78 is again shifted to the position shown at Fig. 14, for repeating the cycle of operation.

The valve 78 is adapted for automatic operation, e. g. it remains in the position shown at Fig. 14 for building up pressure in the well string via valve 70, until this pressure overcomes predetermined resistance, whereupon the pressure shifts the valve 78 to its opposite limit of travel for relieving pressure in the well string via the valve 70, with the valve 78 then remaining in this last mentioned position until predetermined relief of pressure in the well string.

As an instance, a piston 82 is fixed to the valve 78 and is adapted for reciprocation in a cylinder 83; and a valve 84 is fixed to the piston 82 and controls a conduit 85 which provides communication between the conduit 73 and the cylinder 83. A force which may be adjusted, yieldably resists shifting of the piston 82 and the valve 78 from the position shown at Fig. 14, in which position the valve 84 closes the conduit 85; and the valve area at 84 is appreciably smaller than the pressure area of the piston 82. In the illustrated embodiment, this yieldable force is shown as a spring 86, which is adjustable as shown at 86a.

A relief conduit 87 is open to that end of the cylinder 83 with which the conduit 85 communicates; and a relief conduit 88 is closed by the piston 82 when the piston is in the position shown at Fig. 14, but when the piston is at its opposite limit of travel the conduit 88 is open to that end of the cylinder 83 with which the conduit 85 communicates. The relief conduits 87—88 may be connected to the conduit 72. A relief conduit 89 which is regulated by a valve 90, may open to the atmosphere at the end of the cylinder 83 which is opposite the conduit 85.

When the piston 82 and the valve 78 are in the position shown at Fig. 14, the valve 84 closes the conduit 85 and the valve 70 supplies fluid under pressure to the well string. The spring 86 will have been adjusted to yield and open the valve 84 when predetermined pressure is exerted via conduit 85 against the restricted area of this valve, i. e. when predetermined pressure has been built up in the well string; and when the valve 84 opens, the pressure in the well string is exerted via conduit 85 against the relatively large area of the piston 82, thereby shifting the piston and the valve 78 to their opposite limit of travel and thus shifting the valve 70 so as to relieve pressure in the well string. The piston 82 and the valve 78 then remain in their last mentioned position until pressure in the well string has been so reduced that pressure via the conduit 85 against the relatively large area of the piston 82 is overcome by the tension of the spring 86, thereby returning the piston 82 and the valve 78 to the position shown at Fig. 14 and thus shifting the valve 70 so as to again supply fluid under pressure to the well string for repeating the cycle of operation.

I claim:

1. In combination, a conduit, a liner in the conduit, a plunger exposed at one end to the bore of the conduit and having sealed sliding engagement with the liner, a compression chamber defined and normally closed to the bore of the conduit by the liner and the plunger, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, a passageway providing communication between the bore of the conduit and the compression chamber at terminal sliding of the plunger, and means permitting flow via the passageway in only one direction.

2. In combination, a conduit, a liner in the conduit, a plunger exposed at one end to the bore of the conduit and having sealed sliding engagement with the liner, a compression chamber defined and normally closed to the bore of the conduit by the liner and the plunger, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, passageways respectively providing communication between the bore of the conduit and the compression chamber at terminal sliding of the plunger in opposite directions, and means permitting flow via each passageway in only one direction.

3. In combination, a conduit, a liner in the conduit, a plunger exposed at one end to the bore of the conduit and having sealed sliding engagement with the liner, a compression chamber defined and closed to the bore of the conduit by the liner and the plunger, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, an auxiliary chamber, means for precharging the auxiliary chamber with fluid under pressure, and a valve controlling communication between the auxiliary chamber and the compression chamber and tending to open and close respectively responsive to pressure in the compression chamber and in the auxiliary chamber.

4. In combination, a conduit, a liner in the conduit, a plunger exposed at one end to the bore of the conduit and having sealed sliding engagement with the liner, a compression chamber defined and closed to the bore of the conduit by the liner and the plunger, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, an auxiliary chamber, means for precharging the auxiliary chamber with fluid under pressure, a valve controlling communication between the auxiliary chamber and the compression chamber and tending to open and close respectively responsive to pressure in the compression chamber and in the auxiliary chamber, and means operative responsive to opening the valve for retaining the same in open position.

5. In combination, a conduit, a plurality of liners longitudinally spaced in the conduit in radially spaced relation from the wall thereof, a plurality of plunger sleeves suspended from one another and each exposed at one end to the bore of the conduit and having sealed sliding engagement on the respective liners, a compression chamber defined and closed to the bore of the conduit by each of the associated liners and plunger sleeves, means for alternately exerting and relieving fluid pressure via the bore of the conduit, the plunger sleeves being slidable responsive to said fluid pressure, in direction contracting and creating pressure in the compression chambers, and the plunger sleeves being slidable in the opposite direction upon relief of fluid pressure in the bore of the conduit and responsive to pressure in the compression chambers.

6. In combination, a conduit, a pair of liners one beyond the other in the conduit and having bores of different diameter, a plunger having ends of different diameter for sealed sliding engagement in the bores of the respective liners, a compression chamber radially defined by the liner of larger diameter and the plunger-end of smaller diameter, and closed at its ends to the bore of the conduit by the plunger-end of larger diameter and the proximate end of the liner of smaller diameter, the plunger-end of larger diameter being exposed to the bore of the conduit, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, a passageway via the plunger-end of larger diameter, normally closed by the liner of larger diameter but providing for flow from the bore of the conduit to the compression chamber at terminal sliding of the plunger in the first mentioned direction, and a check valve in the passageway closing against reverse flow via the passageway.

7. In combination, a conduit, a liner, means suspending the liner in the conduit in radially spaced relation from the wall thereof, a plunger comprising a head and a depending sleeve, the plunger head being exposed to the bore of the conduit and having sealed slidable engagement on the suspension means, the plunger sleeve having sealed sliding engagement on the liner, a compression chamber defined and closed to the bore of the conduit by the plunger and the liner, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, a passageway via the liner, normally closed by the plunger head but providing for flow from the bore of the conduit to the compression chamber at terminal sliding of the plunger in the first mentioned direction, and a check valve in the passageway closing against reverse flow via the passageway.

8. In combination, a conduit, radial supporting means in the bore of the conduit, a liner projecting upwardly from the supporting means in radially spaced relation from the wall of the conduit, a plunger comprising a head and a depending sleeve, the plunger head being exposed to the bore of the conduit, the plunger sleeve having sealed sliding engagement on the liner, a compression chamber defined and closed to the bore of the conduit by the plunger and the liner, means for alternately exerting and relieving fluid pressure via the bore of the conduit, the plunger being slidable responsive to said fluid pressure, in direction contracting and creating pressure in the compression chamber, the plunger being slidable in the opposite direction upon relief of fluid pressure in the bore of the conduit and responsive to pressure in the compression chamber, a passageway via the liner, normally closed by the plunger sleeve but providing for flow from the bore of the conduit to the compression chamber at terminal sliding of the plunger in the first mentioned direction, and a check valve in the passageway closing against reverse flow via the passageway.

JESSE E. HALL.